United States Patent
Manyam

(10) Patent No.: US 11,941,679 B1
(45) Date of Patent: Mar. 26, 2024

(54) NOTIFYING USERS OF ITEM EXPIRATION

(71) Applicant: Amazon Technologies, Inc., Seattle, WA (US)

(72) Inventor: Ohil Krishnamurthy Manyam, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 16/414,645

(22) Filed: May 16, 2019

Related U.S. Application Data

(62) Division of application No. 14/109,250, filed on Dec. 17, 2013, now Pat. No. 10,319,021.

(51) Int. Cl.
| | |
|---|---|
| G06Q 30/00 | (2023.01) |
| G06Q 30/0204 | (2023.01) |
| G06Q 30/0251 | (2023.01) |
| G06Q 30/0601 | (2023.01) |

(52) U.S. Cl.
CPC ..... *G06Q 30/0631* (2013.01); *G06Q 30/0205* (2013.01); *G06Q 30/0255* (2013.01); *G06Q 30/0261* (2013.01)

(58) Field of Classification Search
CPC ........... G06Q 30/0631; G06Q 30/0261; G06Q 30/0205; G06Q 30/0255
USPC ............................................... 705/26.1–27.2
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix et al. | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 8,744,923 B1 * | 6/2014 | McKay ............. | G06Q 30/0264 |
| | | | 705/26.1 |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Anand Loharikar

(74) *Attorney, Agent, or Firm* — Athorus, PLLC

(57) ABSTRACT

Described is a system and method for monitoring the expiration date of items and determining if an item previously picked by a user will expire before the next anticipated arrival date of the user at a materials handling facility. If the previously picked item will expire before the next anticipated arrival date of the user, the user may receive a recommendation to pick a replacement item so they do not have to return to the materials handling facility early to replace the expired item.

20 Claims, 9 Drawing Sheets

(56) References Cited

U.S. PATENT DOCUMENTS

| | | |
|---|---|---|
| 2011/0011936 A1 | 1/2011 | Morandi et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2015/0019391 A1 | 1/2015 | Kumar et al. |
| 2015/0073907 A1 | 3/2015 | Purves et al. |
| 2015/0088642 A1* | 3/2015 | Mathew ............ G06Q 30/0631 |
| | | 705/14.51 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

NOTIFYING USERS OF ITEM EXPIRATION

PRIORITY CLAIM

This application is a Divisional of U.S. patent application Ser. No. 14/109,250, filed Dec. 17, 2013, the contents of which are herein incorporated by reference

BACKGROUND

Retailers, wholesalers and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment center, that can be used to replenish inventory located in the shopping areas and/or to satisfy orders for items that are placed through other channels (e.g., e-commerce). Other examples of entities that maintain inventory include libraries, museums, rental centers and the like. In each instance, the user (e.g., picker, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference number in different figures indicates similar or identical items or features.

Figure 1:
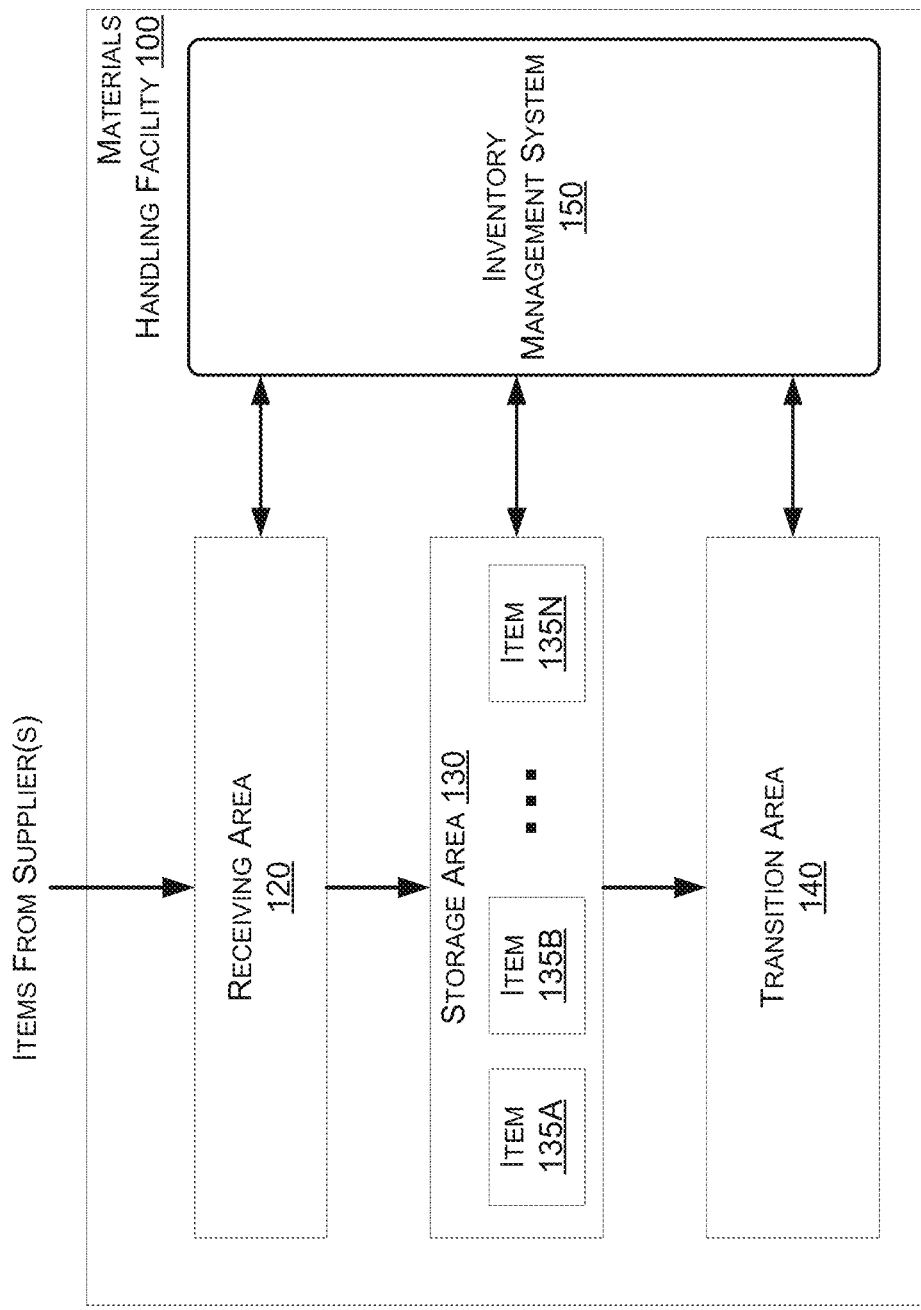
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed descriptions thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and process for providing reminders to users regarding items they have previously picked that will be expiring soon. Many items, such as food, detergent, medicine, etc., expire over a period of time, sometimes before they can be consumed by the user. The examples described herein maintain item expiration information for previously picked items and also maintain information regarding how frequently a user visits a materials handling facility. If the user is located at the materials handling facility and a previously picked item will expire before the user is expected to return to the materials handling facility, the implementations described herein may recommend to the user that they pick a replacement item during their current visit to the materials handling facility. This recommendation may be made because if the user does not repurchase a replacement item during the current visit, the item will expire and the user will either not have the item for use/consumption or they will have to make an unplanned trip to the materials handling facility at a later time to repurchase a replacement item.

In some implementations, if the user is not currently located at the materials handling facility, it may be determined when the user is anticipated to next visit the materials handling facility and recommendations for previously purchased items may be made to the user so the user can include them in a pick list of items to be picked and/or purchased when the user is next at the materials handling facility. For example, if the current day is Wednesday and the user typically visits the materials handling facility every Friday, the implementations described herein may identify items that will expire before the user's second next anticipated visit to the materials handling facility and recommend to the user that those items be repurchased during their next visit to the materials handling facility. For example, the implementations described herein may determine that the milk the user previously purchased will expire in 10 days. If the user is expected to visit the materials handling facility in two days and the user's frequency of visit is every seven days, the implementations described herein will recommend that the user purchase milk during their next visit to the materials handling facility. This recommendation is made so that the user has milk that has not expired before the second next visit to the materials handling facility.

Previously purchased items may include, but are not limited to, items purchased at the materials handling facility, items purchased at a different materials handling facility, items purchased from an electronic commerce website, etc. Likewise, while the examples discussed herein describe determining the frequency with which a user visits a materials handling facility, the implementations are equally applicable to determining the frequency with which a user visits an electronic commerce website and recommends that a user repurchase items based on the frequency with which the user visits the electronic commerce website.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within the materials handling facility 100 is depicted functionally rather than schematically. For example, in some implementations, multiple different receiving areas 120, storage areas 130, and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location, expiration date or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage. In some implementations, as items are placed in the storage area 130, the specific location of the item may be associated with the item and stored in the inventory data store 815.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees and/or automated units may pick items 135 using written or electronic pick lists derived from customer orders.

Figure 2:
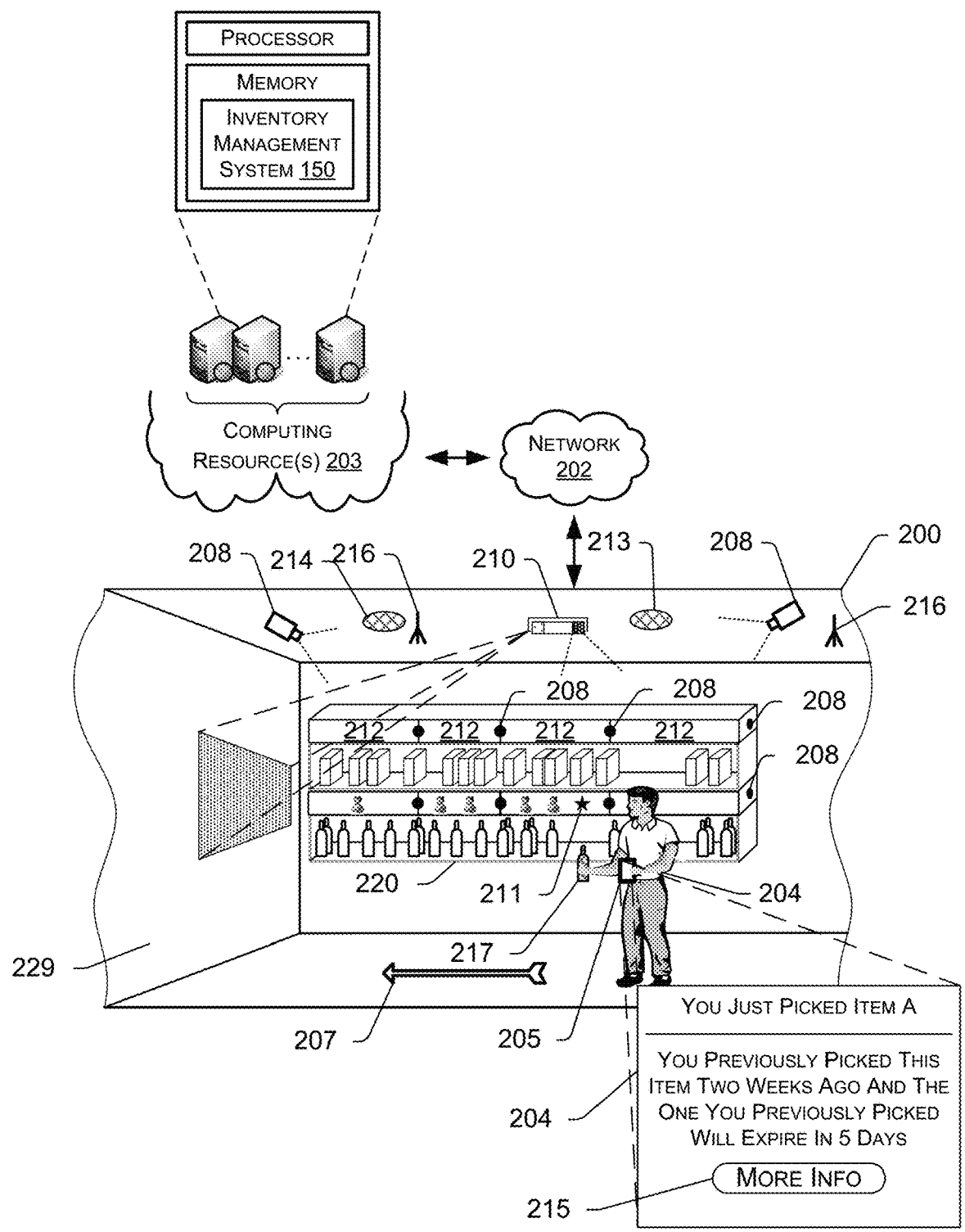
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory locations. For example, a series of cameras 208 may be positioned on external portions of the inventory locations and positioned to capture images of users and/or the location surrounding the inventory location. Likewise, one or more cameras 208 may be positioned within the inventory locations to capture images of items stored in the inventory locations.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, a scale, a light curtain, etc., may be utilized with the implementations described herein. For example, a pressure sensor, load cell and/or a scale may be included in a shelf of the inventory area and used to detect when an item is added and/or removed from inventory locations.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than, or in addition to, processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

In some implementations, a user 204 located in the materials handling facility 200 may possess a portable device 205 and obtain information about items located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

Generally, the inventory management system 150 may include one or more input/output devices, such as imaging devices (e.g., cameras) 208, projectors 210, displays 212, speakers 213, microphones 214, etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras or other small sized cameras) located in the aisles near the inventory items.

Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s), such as server system 203 that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202.

As the user moves around the materials handling facility, the inventory management system 150 may assist the user in identifying items to be picked and/or discovering information about items by processing images collected by input/output components 208-216 positioned around the materials handling facility. For example, when the user reaches a location in the materials handling facility 200 that includes an item to be picked and/or that corresponds with a an item type of a previously picked item that will expire before the user's next anticipated arrival at the materials handling facility, a visual identifier may be presented at, on or near the item. For example, the visual identifier 211 is presented over the location of the item 217 that was picked by the user 204.

In addition to, or as an alternative to visual and/or audio location determination and tracking of the user, the inventory management system 150 may also utilize other techniques, such as triangulation between antennas 216, to determine the location of the user 204 as the user moves through the materials handling facility 200. In other examples, the portable device 205 may include a global positioning system (GPS) receiver that obtains GPS information as to the location of the portable device 205. In other implementations, the portable device 205 may be detectable and/or communicate with an indoor positioning system. In such an implementation, the portable device 205 may provide the received GPS information to the inventory management system 150. In other implementations, the portable device 205 may be detectable and/or communicate with an indoor positioning system.

If information is presented to the user from the inventory management system 150 via the portable device 205, the user 204 may interact with the inventory management system 150 via the portable device 205. For example, the user 204 may interact with the portable device 205 by selecting (e.g., via a touch screen) a display control, such as the "More Info" control 215. If the user selects the "More Info" control 215, the portable device 205 may submit a request to the inventory management system 150 for additional item information. The inventory management system 150, upon receiving an additional item information request from the portable device 205, may retrieve additional item information and provide it back to the user via the portable device 205, present it on one of the displays 212, or project it from the projector 210 onto a surface, such as the surface 229. For example, the inventory management system 150 may identify a display location near the user for presenting the information. If the user is in a location where there are displays, such as displays 212 that are available for use, the display 212 closest to the user 204 may be selected for presenting the additional item information to the user. Alternatively, a projector 210 may be used to project additional item information onto a surface area 229 near the user 204.

Figure 3:
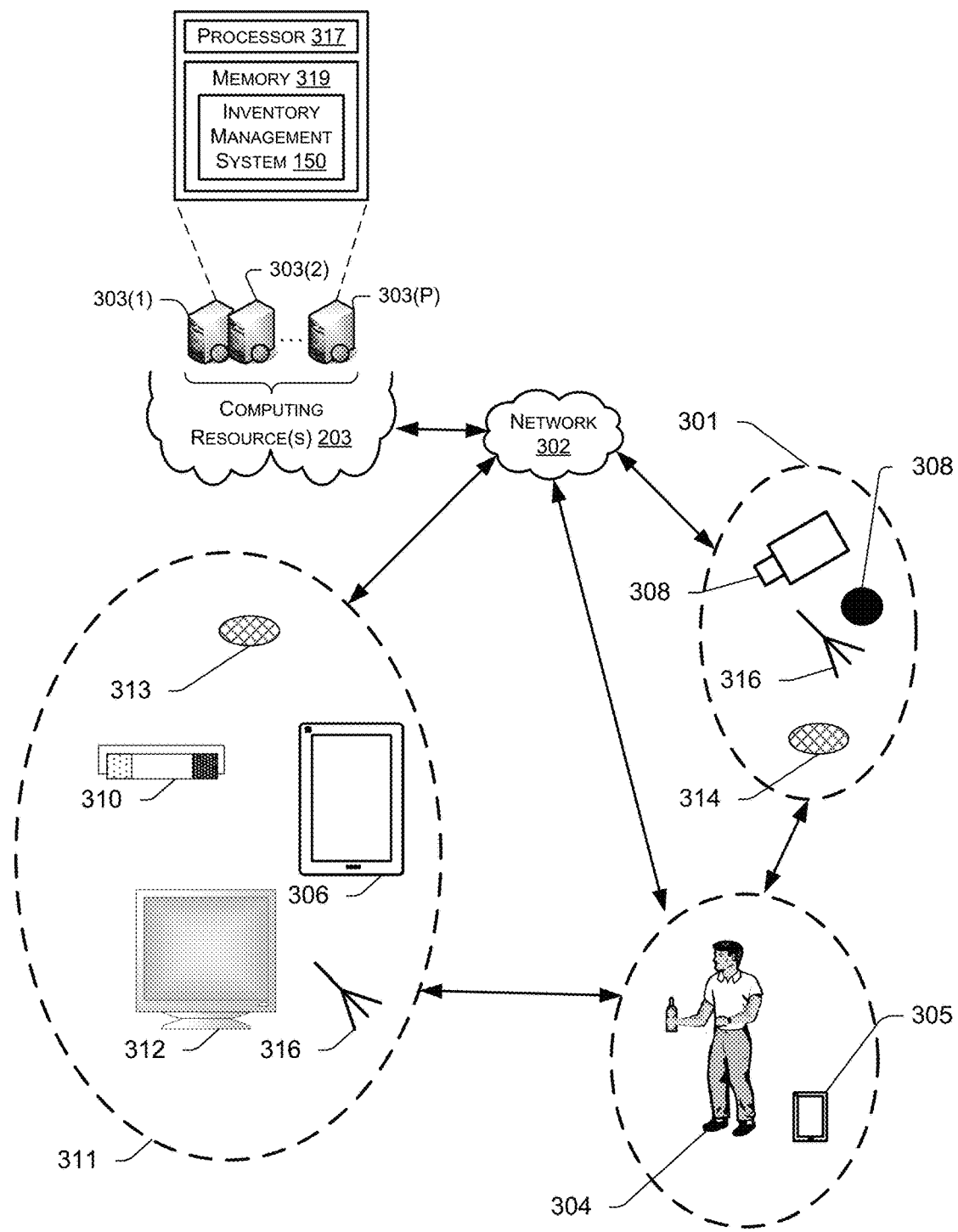
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 301, output components 311, and computing resource(s) 203. The input components 301 may include an imaging device 308, microphone 314, antenna 316, or any other component that is capable of receiving input about the surrounding environment from the user of the portable device and/or from the portable device. The output components 311 may include a projector 310, a portable device 306, a display 312, an antenna 316, a radio (not shown), speakers 313 and/or any other component that is capable of providing output to the surrounding environment, the user and/or the portable device.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 301, output components 311, and/or directly with the portable device 305 and/or the user 304.

As illustrated, the computing resource(s) 203 may be remote from the environment and implemented as one or more servers 303(1), 303(2), . . . , 303(P) and may, in some instances form a portion of a network-accessible computing platform implemented as a computing infrastructure of processors, storage, software, data access, and so forth that is maintained and accessible by components/devices of the inventory management system 150 and/or the portable device 305 via a network 302, such as the Internet. For example, the computing resources 203 may process images of users 304 to identify the user 304 and/or to identify items picked by the user 304. The computing resource(s) 203 does not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers" and so forth.

Each of the servers 303(1)-(P) include a processor 317 and memory 319, which may store or otherwise have access to an inventory management system 150, which may include or provide image processing (e.g., for user identification and/or item identification), inventory tracking and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.) and/or other connection technologies.

Figure 4A:
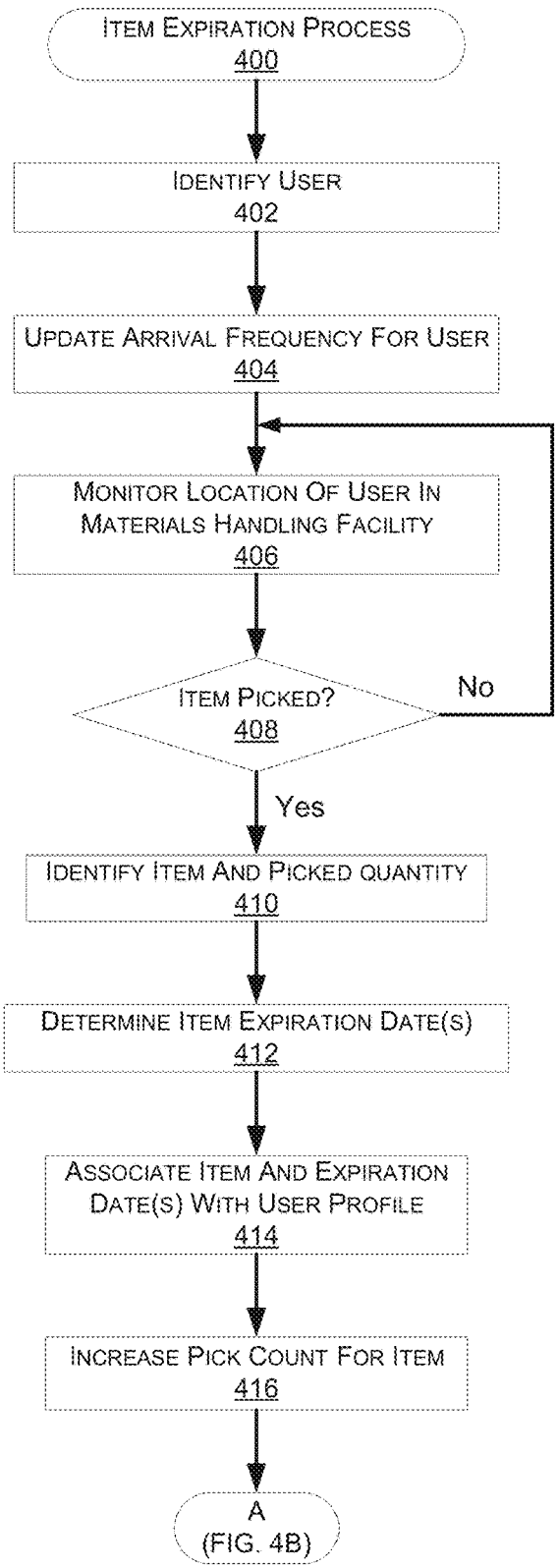
FIGS. 4A-4B depict a flow diagram of an example item expiration process, according to some implementations.
Figure 4B:
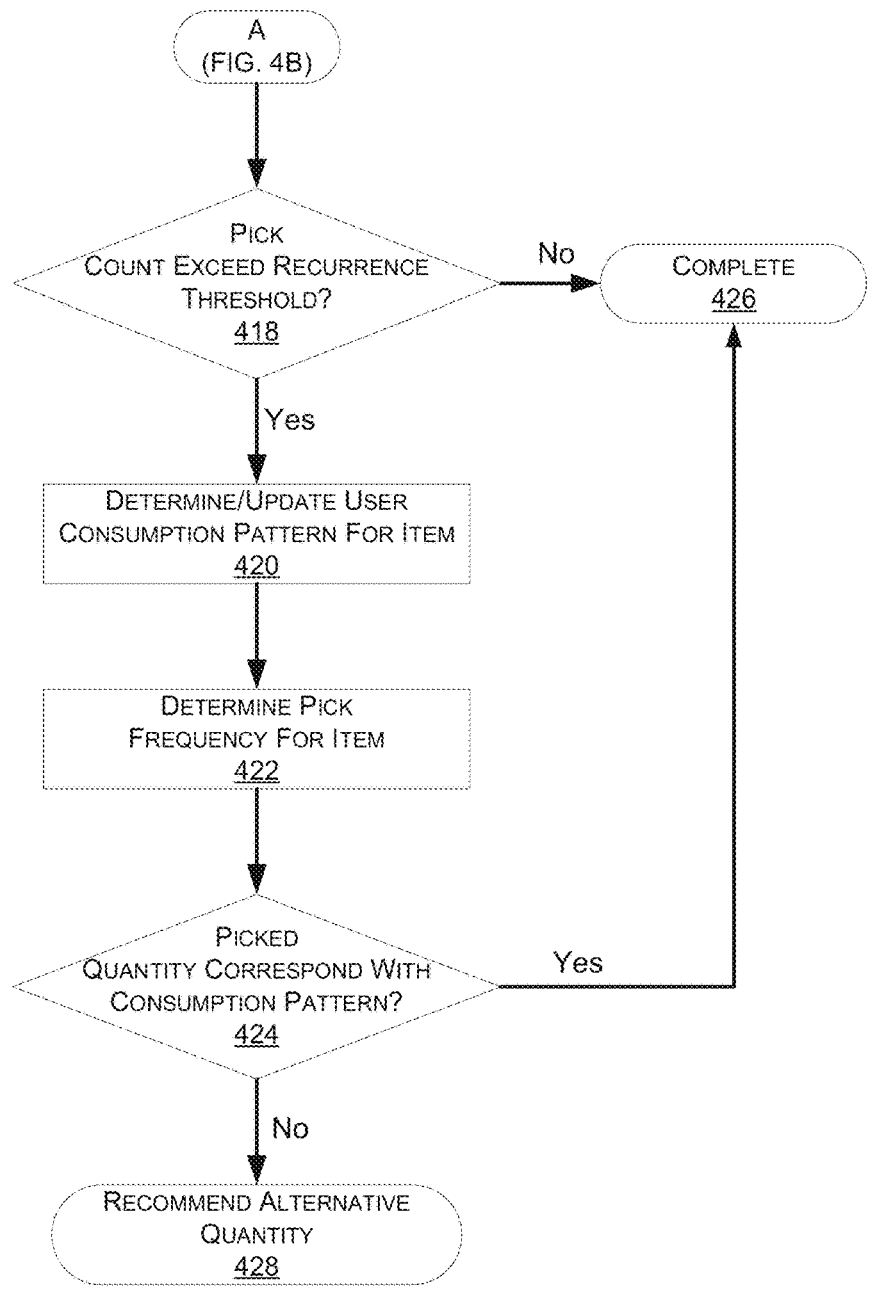

FIGS. 4A-4B depict a flow diagram of an example item expiration process 400, according to some implementations. The process of FIGS. 4A and 4B and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by identifying a user at or within the materials handling facility, as in 402. A user may be identified, for example, by obtaining one or more images of the user and processing those images to identify the user. As discussed above, various techniques may be used to process the images. For example, image capture and facial and/or feature recognition may be used to process the image. Alternatively, or in addition thereto, a user may provide an identification, such as a user identification and password, active tag (e.g., RFID) that includes a unique identifier associated with the user, visual tags (e.g., barcodes, bokodes), biometrics, etc. Upon identifying the user, an arrival frequency maintained for the user may be updated, as in 404. If this is the user's first visit to the materials handling facility, the arrival frequency may be set to zero. However, if the user has previously arrived at the materials handling facility, the time between the current arrival and the previous arrival may be determined. That difference may be established as the arrival frequency. If the user has visited the materials handling facility multiple times, an average of the time between each visit may be used as the arrival frequency. Alternatively, if there is a difference that occurs between a majority of the visits, that difference may be established as the arrival frequency.

As the user moves through the materials handling facility, the location of the user may be monitored, as in 406. In some implementations, distinguishing features of the user may be detected during user identification and those distinguishing features may be used to assist in monitoring the location of the user as they move through the materials handling facility. For example, if the user is wearing a bright colored shirt, has a tattoo, is wearing a hat, etc., any of those distinguishing features may be detected and utilized to assist in monitoring the location of the user while in the materials handling facility. For example, images of the user may be periodically captured and used to locate the user within the materials handling facility. In other implementations, an identifier provided by a mobile device in the possession of the user may be identified and used to monitor the location of the user. Likewise, the user's gait, cadence, body language, etc., may be determined and utilized to assist in monitoring the location of the user within the materials handling facility.

Returning to the example process 400, a determination may be made as to whether the user has picked an item, as in 408. If they have not picked an item, the example process 400 returns to block 406 and continues. When it is determined that the user has picked an item, the picked item is identified and the quantity of the picked item is determined, as in 410. Item identification and quantity may be determined, for example, by obtaining one or more images of the item(s) when picked by the user. Images may be obtained/captured by imaging devices 208 positioned throughout the materials handling facility. In some implementations, images of the area surrounding the item (e.g., shelf from which the item was selected, other nearby items) may also be obtained/captured. The obtained/captured images are processed to identify the picked item and determine the quantity of the picked item, as in 408. As discussed above, images may be provided to computing resource(s) 203 and processed to identify the picked item and the quantity picked. For example, object recognition/analysis may be performed on the images to identify the shape, size, color, etc., of the item and that information may be compared with stored item information. Likewise, character recognition may be performed on the image to identify characters, words, etc., on the item.

In some implementations, as an alternative and/or in addition to using image recognition to identify the item, one or more other input sensors may be utilized. For example, the shelf from which the item was picked may include a pressure sensor, load cell, scale or other input component that can detect a change in weight and/or contact pattern when the item(s) are removed from the shelf. The inventory management system 150 may maintain information identifying the items at each location within the materials handling facility. When the item is picked from the shelf, the removal of the item is detected and the identification of the item can be determined based on the location of the removed item. Likewise, the quantity of the item may be determined based on the number of items, weight and/or shape of items that were removed.

Upon identifying the picked item and the quantity, an item expiration date may be determined for the picked item, as in 412. If the quantity of the item picked is greater than one, each item may have a different expiration date that is determined. In some implementations, the expiration date may be included in the picked item and detected from the images captured of the picked item. For example, a visual identifier may be included on the item that identifies the expiration date. In other implementations, the inventory management system may maintain in an item expiration data store the expiration information for each item and, when the picked item is identified, the inventory management system may identify the expiration date from stored information.

Some items may not have specific expiration dates. For example, produce typically does not have a specific expiration date. In such an example, a determined expiration date may be associated with the item. The determined expiration date may represent when the item is expected to expire (e.g., become overripe, rotten, etc.). This expiration date may be different for different items, vary depending on the time of year, the location of the materials handling facility and/or vary depending on the user. For example, fruit may expire faster in the warmer months of the year due to the increased temperature. Likewise, some users may provide feedback identifying that they store some items in a manner that will allow them to last longer. For example, some users may identify that they store fruit in the refrigerator, causing the fruit to last longer. In comparison, some users may not store fruit in the refrigerator, thereby resulting in the fruit expiring faster for those users. In each case, the expiration date for the items may be different for different users.

The picked item, quantity and corresponding expiration date(s) are associated with the user profile for the identified user, as in 414. In addition, the pick count identifying how many times the user has picked the item is also increased, as in 416. Based on the pick count, a determination is made as to whether the pick count exceeds a recurrence threshold, as in 418. The recurrence threshold may be any defined number or score that when reached it may be determined that the user picks the item on a recurring basis such that a pattern can be developed. In some implementations, the recurrence threshold may be two picks, while in others it may require more than two picks. Likewise, the recurrence threshold may vary for different users and/or different items.

If it is determined that the pick count exceeds the recurrence threshold, the consumption pattern for the item may be determined and/or updated based on the user's past purchase history and current pick of the item, as in 420. For example, if the user buys a gallon of milk every seven days on a recurring basis, it may be determined that the user, on average, consumes approximately 18 fluid ounces of milk per day. Likewise, the pick frequency may be determined, as in 422. The pick frequency may identify the frequency with which the user picks the item from the materials handling facility. In some implementations, the pick frequency may also identify the quantity of the item when picked.

In some implementations, the consumption pattern may vary for different times of the year, as may the pick frequency. For example, a user may purchase more fruit during the summer months than during the winter months. In such an example, the consumption pattern and/or pick frequency may vary for different months of the year for that item.

Based on the determined quantity of the picked item, a determination may be made as to whether the picked quantity corresponds with the determined consumption pattern, as in 424. If it is determined that the picked quantity corresponds with the consumption pattern, or if it is determined that the pick count does not exceed the recurrence threshold, the example process completes, as in 426. However, if it is determined that the picked quantity does not correspond with the consumption pattern, an alternative quantity may be recommended to the user, as in 428. For example, if the consumption pattern identifies that the user typically consumes 24 eggs every two weeks and typically visits the materials handling facility every two weeks, but the user has only picked 12 eggs, it may be determined that the user's consumption pattern does not correspond with the picked quantity. In such an example, a recommendation or other notice may be presented to the user asking if they would like to pick the additional quantity of the item. For example, a notice may be provided to and presented on the user's portable device 205. Alternatively, the notice may be presented to the user through one of the output devices that are near the user, such as a display 212.

A similar notice may be presented if the user has picked a larger quantity of an item than identified in the consumption pattern. For example, if the user typically picks five tomatoes each time they visit the materials handling facility but this time the user has picked fifteen tomatoes, it may be determined that the quantity of picked items does not correspond with the consumption pattern. Likewise, it may be determined that, based on the users consumption pattern, some of the picked tomatoes will expire before they are consumed by the user. In such an example, a notice or other recommendation may be provided to the user asking if they intended to pick a quantity larger than they typically consume and that, unless they have a different consumption pattern planned, some of the picked tomatoes will expire before they are consumed. In either case, the user may modify the quantity of the picked item or confirm that they intended to pick the quantity of the item that was picked.

Figure 5:
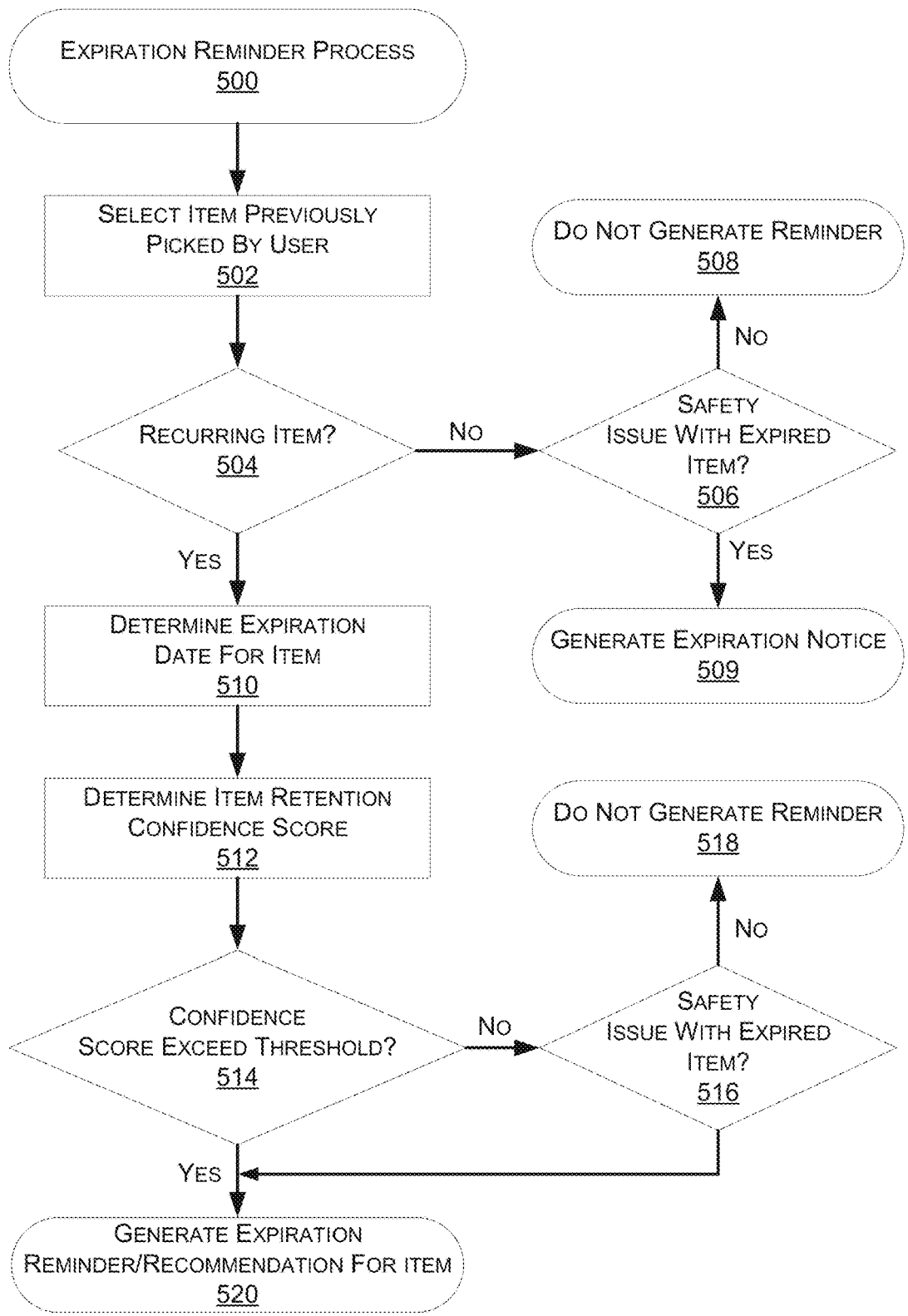
FIG. 5 depicts an expiration reminder process, according to some implementations.

FIG. 5 is a block diagram of an expiration reminder process 500, according to some implementations. The example process may be performed periodically or upon the occurrence of an event. For example, each time a user transitions items out of the materials handling facility, the example process 500 may be performed for each of the items transitioned out of the materials handling facility.

The example process 500 begins by selecting an item previously picked by the user, as in 502. For the selected item, a determination is made as to whether the item is a recurring item, as in 504. An item may be identified as a recurring item if the user picks that type of item with a frequency that exceeds a recurrence threshold. If it is determined that the item is not a recurring item, a determination may be made as to whether the item has safety concerns regarding the consumption or use of the item after it has expired, as in 506. If it is determined that there are no safety concerns, no reminder is generated, as in 508. However, if it is determined that there are safety concerns regarding the consumption of the item when expired, an expiration notice reminder may be generated and associated with the user's profile, as in 509.

Returning to decision block 504, if it is determined that the item is a recurring item, the expiration date for the previously picked item is determined, as in 510. As discussed above, when the item is picked by the user, the expiration date may be determined and associated with the user's profile.

An item retention confidence score for the item may also be determined, as in 512. The item retention confidence score identifies the confidence level that the user still has some or all of the item at the time of the reminder and/or at the date of expiration of the item. For items that expire quickly, such as produce, meat, etc. (e.g., within a week or two weeks), and the user frequently repurchases the item at a regular interval, the retention confidence score may be high because it can be determined with a high degree of probability whether the user has any of the item remaining. In comparison, if the expiration date is several years from the purchase date, such as medicine, salad dressing, etc., and the item is not frequently repurchased, the retention confidence score may be low because it is difficult to determine whether the user still has the item. In some implementations, the retention confidence score may be set to zero and/or a notification may be established not to provide an expiration reminder if, for example, the user identifies that they have consumed the item and/or added the item to a pick list. In such a case, a reminder may not be needed because the user is already planning to pick the item.

Returning to the example process 500, a determination may be made as to whether the item retention confidence score exceeds a threshold, as in 514. The threshold may be any defined value or score that must be exceeded by the item retention confidence score before an expiration reminder is created for the user with respect to the item. For example, the threshold may require that the confidence score be above 85% (if the confidence score is between 0%-100%). Any value may be established for the confidence threshold. Likewise, the confidence threshold may vary for different items and/or for different users.

If it is determined that the item retention confidence score does not exceed the threshold, a determination may be made as to whether there is a safety concern with respect to the item, as in 516. If it is determined that there are no safety concerns, no reminder is generated, as in 518. However, if it is determined that there are safety concerns regarding the consumption of the item after it has expired, or if it is determined that the confidence score exceeds the threshold, an expiration reminder or re-pick recommendation (a recommendation to pick a replacement item) may be generated and associated with the user's profile, as in 520.

Figure 6:
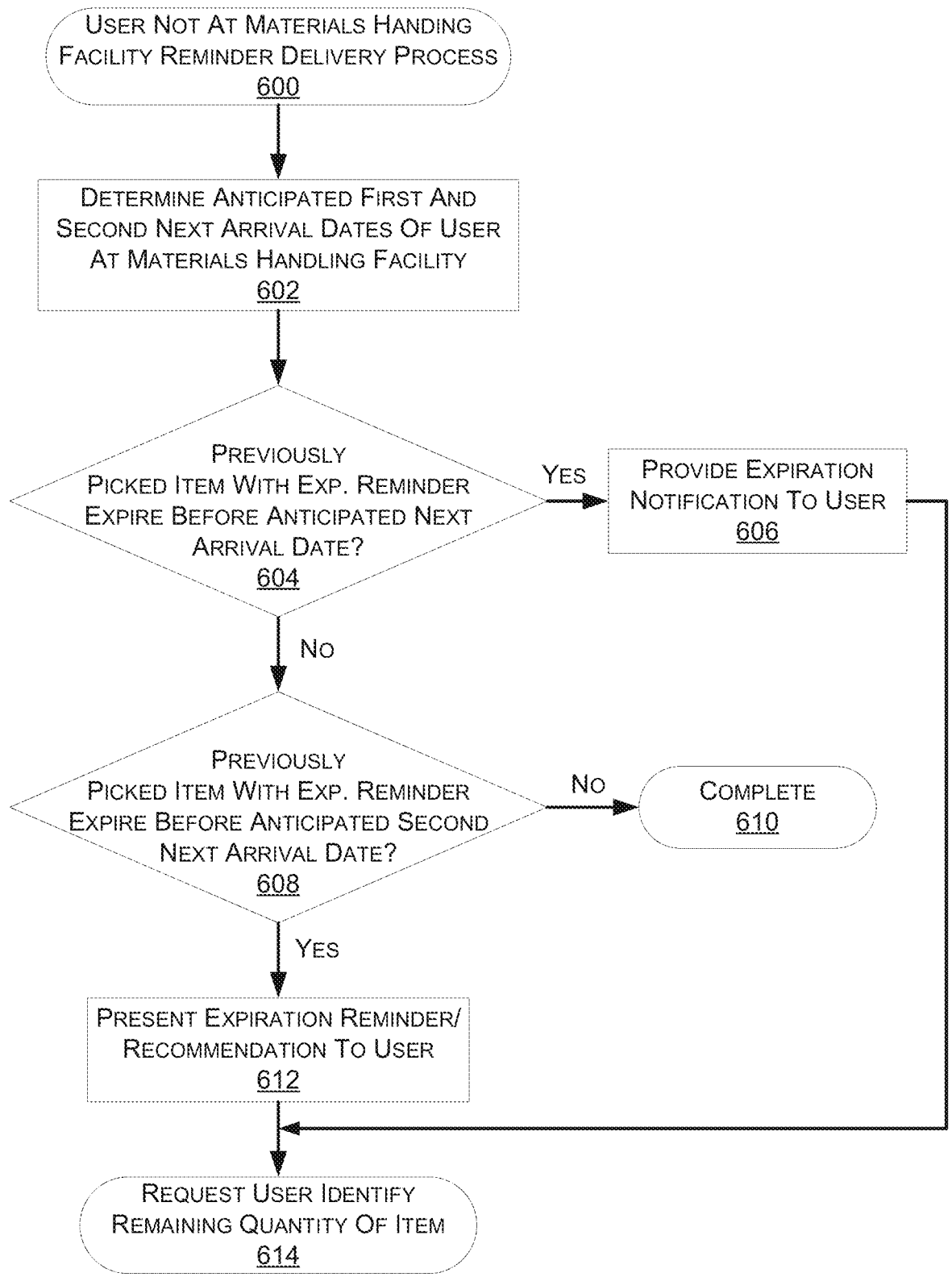
FIG. 6 depicts a reminder delivery process for providing reminders to a user not located at a materials handling facility, according to some implementations.

FIG. 6 depicts a reminder delivery process 600 for providing reminders or recommendations to a user not located at a materials handling facility, according to some implementations. The example process 600 begins by determining anticipated first and second next arrival dates of a user at a materials handling facility, as in 602. As discussed above with respect to FIGS. 4A-4B, each time a user arrives at a materials handling facility an arrival frequency for the user is updated. The arrival frequency may be utilized to determine the next two times that the user will visit the materials handling facility. For example, if the arrival frequency identifies that the user generally visits the materials handling facility every 10 days and it has been 5 days since the last visit, it may be determined that the next anticipated arrival is in 5 days and the second next anticipated arrival is in 15 days. In some implementations, the user may be asked when they expect to return and the user may, in response, identify the next anticipated arrival date.

A determination may then be made as to whether a previously picked item with an associated expiration reminder (generated as discussed with respect to FIG. 5) will expire before the next anticipated arrival date, as in 604. If it is determined that the item will expire before the next anticipated arrival date, the expiration notification associated with the item and the user's profile may be provided to the user, as in 606. The notification may be provided in a variety of manners. For example, an electronic mail may be sent to an email account associated with the user profile of the user, a short message (SMS) and/or multimedia message may be sent to a portable device associated with the user, a voice message may be delivered to the user, a physical notification (e.g., postal mail) may be mailed to the user, the notification may be included on a web page that is accessible to the user, printed on the back of a receipt, etc. In some implementations, the form of the expiration notification may be dependent on safety concerns around the user consuming the expired item. For example, if the expired item is a medicine that can become harmful after expiration, the notification may be more intrusive (e.g., a voice message). In comparison, if the item expiration does not present a safety concern, the expiration notification may be less intrusive (e.g., an email). In addition, the user may establish preferences as to how and/or if expiration notifications are to be provided.

If it is determined that the item is not going to expire before the next anticipated visit by the user to the materials handling facility, a determination is made as to whether the item with an associated expiration reminder will expire before the second anticipated arrival date, as in 608. If it is determined that the item will not expire before the second anticipated arrival date, the process 600 completes, as in 610. However, if it is determined that the item will expire before the second next anticipated arrival date, the associated expiration reminder is provided to the user, as in 612. Similar to the expiration notification, the expiration reminder may be provided to the user via any variety of communication options (e.g., email, SMS, multimedia message, voice message, postal mail). As still further examples, the reminder may be included on a web page that is accessible to the user, printed on the back of a receipt, etc. In some implementations, the expiration reminder may be in the form of a recommendation to the user that they should re-pick the item and/or pick a replacement item during their next anticipated visit because the item will expire before their second next anticipated visit to the materials handling facility. In still other examples, the item may be automatically added to the user's pick list, or other list of items to be picked while at the materials handling facility and/or presented on a web page that is accessible to the user. In some implementations, the user may specify how and/or if they are to receive expiration reminders or recommendations.

In addition to providing expiration notification (606) or expiration reminders (612), a request may also be presented to the user to identify the amount of the item that is remaining at the time of the expiration, as in 614. In some implementations, an incentive, such as a discount, may be offered to encourage the user to identify the amount of the item remaining. Identification of the remaining amount may be provided by the user returning the unused portion to the materials handling facility, providing an image of the item that identifies the amount remaining, completing a questionnaire identifying the amount of the item remaining, etc.

Figure 7:
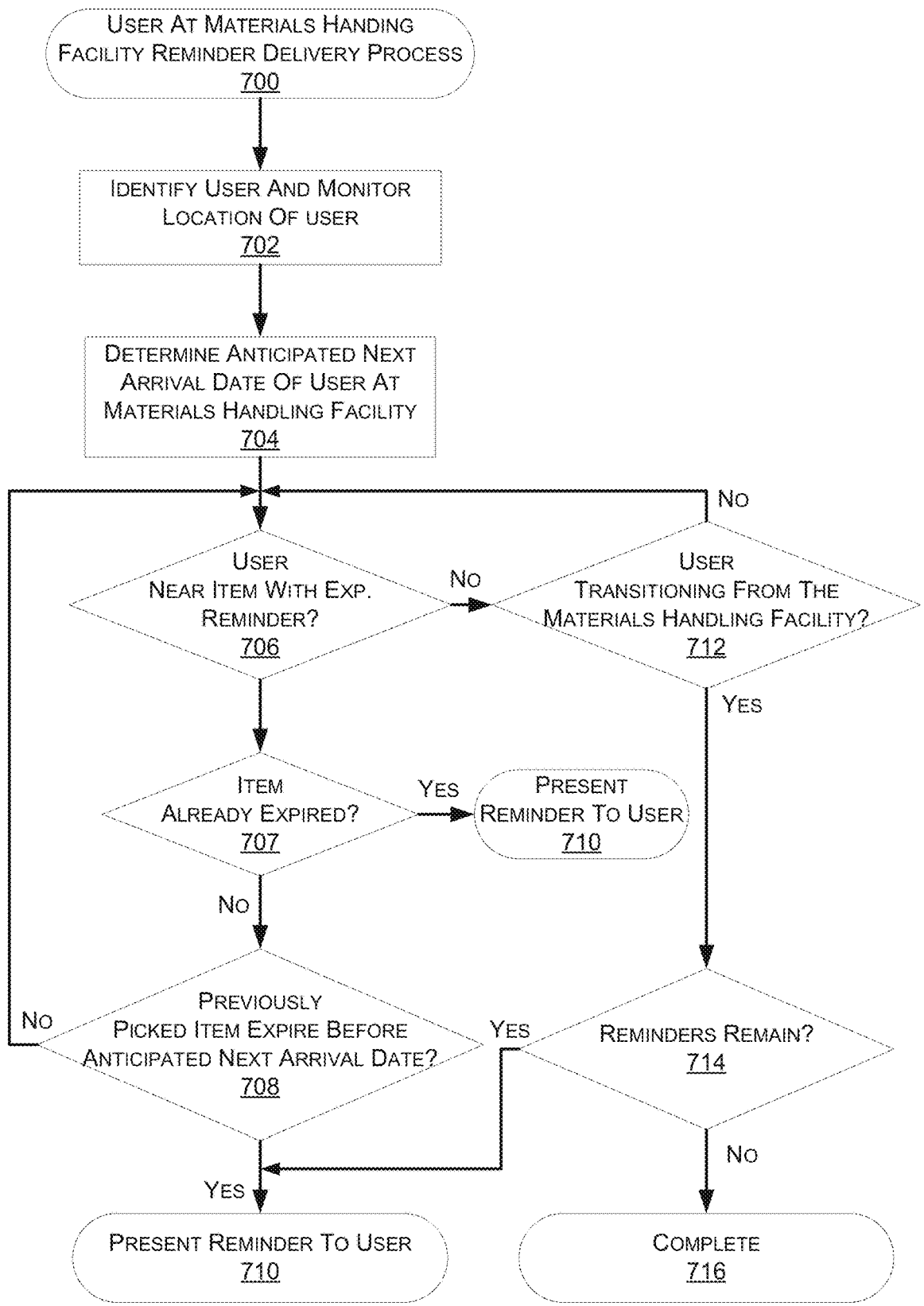
FIG. 7 depicts a reminder delivery process for providing reminders to a user located at a materials handling facility, according to some implementations.

FIG. 7 depicts a reminder delivery process 700 for providing reminders or recommendations to a user located at a materials handling facility, according to some implementations. The example process 700 begins by identifying a user at the materials handling facility and monitoring the location of the user as they move throughout the materials handling facility, as in 702. Techniques for identifying a user and monitoring the user's location are discussed above with respect to FIG. 4A. Upon identifying the user, the next anticipated arrival date of the user at the materials handling facility is determined, as in 704. The next anticipated arrival date may be determined based on the arrival frequency determined as part of the example process 400. For example, if the arrival frequency is every 10 days, it may be determined that the next arrival date of the user will be 10 days from the current date.

As the user moves through the materials handling facility, a determination may be made as to whether the user is near an item with an expiration reminder, as in 706. If it is determined that the user is near an item of the same item type as a picked item with an associated expiration reminder, a determination is made as to whether the previously picked item has already expired, as in 707. If it is determined that the previously picked item has already expired, the reminder is presented to the user, as in 710. In some implementations, in addition to or as an alternative to providing a reminder for expired items, similar or the same items may be picked and available for retrieval by the user while the user is at the materials handling facility.

If it is determined that the item has not yet expired, a determination is made as to whether the item will expire before the anticipated next arrival date, as in 708. If it is determined that the previously picked item will expire before the next anticipated arrival date, the reminder is presented to the user, as in 710. The reminder may be presented in a variety of manners using any of a variety of output devices. For example, the reminder may be provided to and presented by the user's portable device. Alternatively, the reminder may be presented on a display 212, projected onto a nearby surface and/or presented audibly. The reminder may identify the item, the last time the user picked the item, when the previously picked item will expire, etc. If it is determined that the previously picked item will not expire before the next anticipated arrival date, the example process 700 returns to block 706 and continues.

Returning to decision block 706, if it is determined that the user is not near an item with an associated expiration reminder, a determination may be made as to whether the user is transitioning from the materials handling facility, as in 712. It may be determined that a user is transitioning from the materials handling facility, or is about to transition from the materials handling facility, using a variety of techniques. For example, if the user is located in the transition area 140, has picked all the items on their pick list, is no longer looking at items, etc., it may be determined that the user is transitioning from the materials handling facility.

If it is determined that the user is not transitioning from the materials handling facility, the example process returns to decision block 706 and continues. However, if it is determined that the user is or is about to transition from the materials handling facility, a determination is made as to whether there are any reminders associated with the user's profile that correspond to previously picked items that will expire before the user's next anticipated arrival date at the materials handling facility, as in 714. If it is determined that one or more reminders remain for previously picked items that will expire before the user's next anticipated arrival date at the materials handling facility, the example process 700 transitions to block 710 and presents the reminders to the user. These reminders may be presented before the user exits the materials handling facility and/or after they have exited the materials handling facility. If there are no additional reminders associated with the user profile, the example process completes, as in 716.

Figure 8:
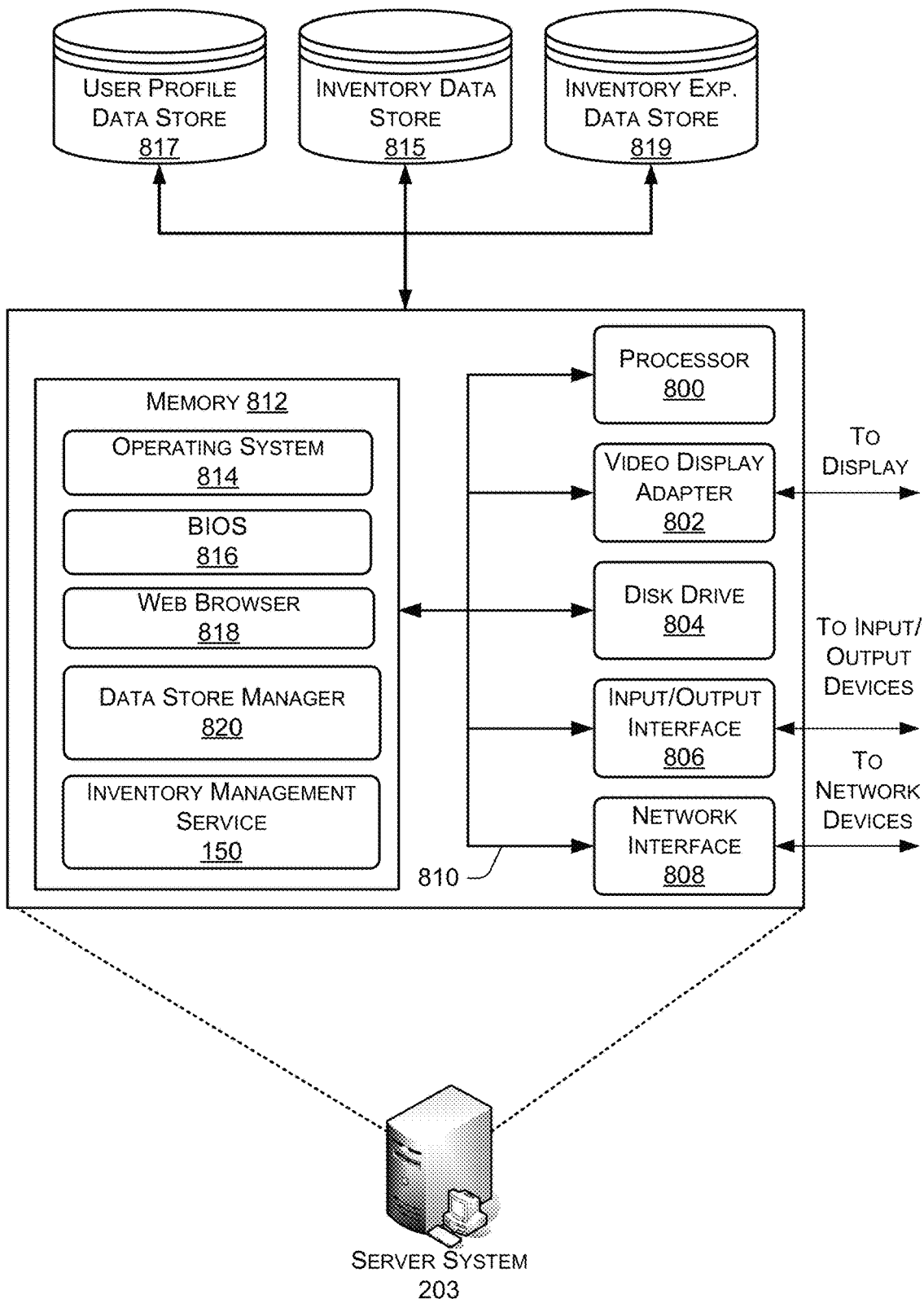
FIG. 8 is a block diagram of an illustrative implementation of a server system that may be used with various implementations.

FIG. 8 is a pictorial diagram of an illustrative implementation of a server system, such as the server system 203 that may be used in the implementations described herein. The server system 203 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 203 to monitor and configure operation of the server system 203. The input/output interface 806 likewise communicates with external input/output devices not shown in FIG. 8, such as a mouse, keyboard, scanner, or other input and output devices that can be operated by an operator of the server system 203. The network interface 808 includes hardware, software, or any combination thereof, to communicate with other computing devices. For example, the network interface 808 may be configured to provide communications between the server system 203 and other computing devices via the network 202, as shown in FIG. 2 and FIG. 3.

The memory 812 generally comprises random access memory (RAM), read-only memory (ROM), flash memory, and/or other volatile or permanent memory. The memory 812 is shown storing an operating system 814 for controlling the operation of the server system 203. A binary input/output system (BIOS) 816 for controlling the low-level operation of the server system 203 is also stored in the memory 812.

The memory 812 additionally stores program code and data for providing network services that allow the inventory management system 150 to identify users and/or items within the materials handling facility. Accordingly, the memory 812 may store a browser application 818. The browser application 818 comprises computer executable instructions, that, when executed by the processor 800, generate or otherwise obtain configurable markup documents, such as Web pages. The browser application 818 communicates with a data store manager application 820 to facilitate data exchange between the inventory data store 815, the user profile data store 817, and/or the inventory expiration data store 819.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 815, 817, 819 as needed to execute aspects of the inventory management system 150.

The data stores 815, 817, 819 can include several separate data tables, databases or other data storage mechanisms and media for storing data relating to a particular aspect. For example, the data stores 815, 817, 819 illustrated include mechanisms for inventory information, user profile information, item expiration information, etc., which can be used to identify users, determine access frequency, consumption patterns and/or expiration dates for items.

It should be understood that there can be many other aspects that may be stored in the data stores 815, 817, 819.

The data stores 815, 817, 819 are operable, through logic associated therewith, to receive instructions from the server system 203 and obtain, update or otherwise process data in response thereto.

In addition to maintaining information about inventory and determining whether to provide a reminder about an item that will expire before the user's next anticipated visit to the materials handling facility, the inventory management system 150 may provide assistance to the user. For example, the inventory management system 150, through communication between the server system 203, may provide information about an item to a user, such as the expiration date, ingredients, price and/or other information about the item.

The memory 812 may also include the inventory management system 150, discussed above. The inventory management system 150 may be executable by the processor 800 to implement one or more of the functions of the server system 203. In one implementation, the inventory management system 150 may represent instructions embodied in one or more software programs stored in the memory 812. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer readable medium bearing computer executable instructions which, when executed on a computing system comprising one or more processors executing the instructions, carry out a method on the computing system for providing an item reminder to a user, the method, comprising:
   determining, at the computing system, over a period of time and based at least in part on position data received from a portable device associated with a user or image data received from one or more of a plurality of imaging devices of a materials handling facility, an arrival frequency of the user indicating a frequency with which the user visits the materials handling facility;
   receiving, at the computing system, at least one of image data from one or more of the plurality of imaging devices of the materials handling facility or an identifier;
   determining, at the computing system and based at least in part on the at least one of the image data or the identifier, that the user is at the materials handling facility; and
   while the user is at the materials handling facility:
      determining, at the computing system and based at least in part on the arrival frequency, a date associated with a next anticipated arrival of the user at the materials handling facility;
      determining, at the computing system, that an item previously picked by the user will expire before the date; and
      based on the determination that the item previously picked by the user will expire before the date, recommending, by the computing system, the item to the user while the user is located at the materials handling facility.

2. The computer readable medium of claim 1, the method further comprising:
   determining, at the computing system, that a second item previously picked by the user has already expired; and
   based on the determination that the second item previously picked by the user has already expired, recommending, with the computing system, the item to the user while the user is located at the materials handling facility.

3. The computer readable medium of claim 1, wherein the recommendation identifies the item to the user and recommends that the user pick an item of a same item type.

4. The computer readable medium of claim 1, the method further comprising:
   determining, at the computing system, that the user is near an inventory location associated with an item type of the item; and
   wherein recommending the item includes transmitting, from the computing system, the recommendation to at least one of the portable device associated with the user or presenting the recommendation to the user using at least one output device positioned within the materials handling facility.

5. The computer readable medium of claim 4, wherein the output device is at least one of a display, a projector, or a speaker.

6. The computer readable medium of claim 1, the method further comprising:
   determining, at the computing system, that the user is transitioning from the materials handling facility;
   determining, at the computing system, that there is at least one previously picked item that will expire before the date and that the user has not picked a replacement item of a same item type as the at least one previously picked item; and
   transmitting, from the computing system and to the user a recommendation to pick the replacement item while the user is located at the materials handling facility.

7. The computer readable medium of claim 1, wherein:
   determining, at the computing system, that an item previously picked by the user will expire before the date includes determining that a plurality of items previously picked by the user will expire before the date; and
   recommending, by the computing system, the item includes recommending a replacement item for each of the plurality of items to the user while the user is located at the materials handling facility.

8. A computing system, comprising:
   one or more processors; and
   a memory coupled to the one or more processors and storing program instructions that when executed cause the one or more processors to at least:
      determine, over a period of time and based at least in part on position data received from a portable device associated with a user or image data received from one or more of a plurality of imaging devices of a materials handling facility, an arrival frequency of the user indicating a frequency with which the user visits the materials handling facility;

determine that the user is at the materials handling facility;

determine a date associated with an anticipated arrival of the user at the materials handling facility;

determine that an item previously picked by the user will expire before the date; and based on the determination that the item previously picked by the user will expire before the date, recommend at least one of the item or an item type of the item to the user while the user is located at the materials handling facility.

9. The computing system of claim 8, wherein the program instructions, that when executed by the one or more processors, further cause the one or more processors to at least:

update the arrival frequency based at least in part on a time between a current arrival of the user at the materials handling facility and a previous arrival of the user at the materials handling facility.

10. The computing system of claim 8, wherein the program instructions that when executed by the one or more processors further cause the one or more processors to at least:

determine that the user is near an inventory location associated with the item type of the item; and wherein the recommendation of the item includes transmission of the recommendation to at least one of the portable device associated with the user or presenting the recommendation to the user using at least one output device positioned within the materials handling facility.

11. The computing system of claim 10, wherein the at least one output device is at least one of a display, a projector, or a speaker.

12. The computing system of claim 8, wherein the program instructions that when executed by the one or more processors further cause the one or more processors to at least:

determine that the user is transitioning from the materials handling facility;

determine that there is at least one previously picked item that will expire before the date and that the user has not picked a replacement item of a same item type as the at least one previously picked item; and send to the user a recommendation to pick the replacement item.

13. The computing system of claim 8, wherein the program instructions that when executed by the one or more processors to cause the one or more processors to determine that an item previously picked by the user will expire before the date further include instructions that when executed by the one or more processors further cause the one or more processors to at least determine that a plurality of items previously picked by the user will expire before the date; and wherein the program instructions that when executed by the one or more processors to cause the one or more processors to recommend the at least one of the item or the item type of the item further include instructions that when executed by the one or more processors further cause the one or more processors to at least recommend a replacement item for each of the plurality of items to the user while the user is located in the materials handling facility.

14. A method, comprising:

at a computing system executing on one or more processors:

determining, at the computing system, over a period of time and based at least in part on position data received from a portable device associated with a user or image data received from one or more of a plurality of imaging devices of a materials handling facility, an arrival frequency of the user indicating a frequency with which the user visits the materials handling facility;

receiving, at the computing system, at least one of image data from one or more of the plurality of imaging devices of the materials handling facility or an identifier;

determining, at the computing system and based at least in part on the at least one of the image data or the identifier, that the user is at the materials handling facility;

while the user is at the materials handling facility:

determining, at the computing system, a date associated with an anticipated arrival of the user at the materials handling facility;

determining, at the computing system, that an item associated with the user will expire before the date; and based on the determination that the item will expire before the date, recommending, by the computing system, the item to the user while the user is located at the materials handling facility.

15. The method of claim 14, wherein determining the arrival frequency, further includes:

determining, at the computing system, the arrival frequency based at least in part on a time between a current arrival of the user at the materials handling facility and a previous arrival of the user at the materials handling facility.

16. The method of claim 14, wherein the recommendation identifies the item to the user and recommends that the user pick an item of a same item type.

17. The method of claim 14, further comprising:

determining, at the computing system, that the user is near an inventory location associated with an item type of the item; and wherein recommending the item includes sending, from the computing system, the recommendation to at least one of the portable device associated with the user or causing, with the computing system, the recommendation to be presented to the user using at least one output device positioned within the materials handling facility.

18. The method of claim 17, wherein the output device is at least one of a display, a projector, or a speaker.

19. The method of claim 14, further comprising:

determining, at the computing system, that the user is transitioning from the materials handling facility;

determining, at the computing system, that there is at least one previously picked item that will expire before the date and that the user has not picked a replacement item of a same item type as the at least one previously picked item; and sending, from the computing system and to the user, a recommendation to pick the replacement item while the user is located at the materials handling facility.

20. The method of claim 14, wherein:

determining that an item previously picked by the user will expire before the date includes determining, at the computing system, that a plurality of items previously picked by the user will expire before the date; and recommending the item includes recommending, by the computing system, a replacement item for each of the plurality of items to the user while the user is located at the materials handling facility.

* * * * *